United States Patent [19]

Kitsuda

[11] 4,422,611

[45] Dec. 27, 1983

[54] LIFTABLE DRIVER'S SEAT FOR AUTOMOBILES

[76] Inventor: Minoru Kitsuda, 3-5, Nishi Yahata 1-chome, City of Hiratsuka, Kanagawa Prefecture, Japan

[21] Appl. No.: 301,388

[22] Filed: Sep. 11, 1981

[51] Int. Cl.³ .............................................. E01B 7/00
[52] U.S. Cl. ..................................... 248/421; 248/394
[58] Field of Search ............... 248/393, 394, 395, 396, 248/429, 430, 424, 421; 297/330, 344, 346; 296/65 R

[56] References Cited

U.S. PATENT DOCUMENTS

| | | | |
|---|---|---|---|
| 2,215,012 | 9/1940 | McGregor | 248/394 |
| 2,302,387 | 11/1942 | Greeno et al. | 248/424 X |
| 2,919,744 | 1/1960 | Tanaka | 297/346 X |
| 3,149,815 | 9/1964 | Cotter et al. | 248/421 |
| 3,188,312 | 6/1965 | Bilancia | 248/394 |
| 4,128,152 | 12/1978 | Tschursch | 248/421 X |
| 4,159,095 | 6/1979 | Pallant | 248/396 |

FOREIGN PATENT DOCUMENTS

| | | | |
|---|---|---|---|
| 1405918 | 1/1969 | Fed. Rep. of Germany | 296/65 R |
| 2236913 | 2/1974 | Fed. Rep. of Germany | 296/65 R |
| 2659308 | 7/1978 | Fed. Rep. of Germany | 248/421 |

Primary Examiner—J. Franklin Foss

[57] ABSTRACT

A liftable driver's seat for automobiles is provided which comprises a seat frame having generally a rectangular shape, bearing blocks disposed near each corner of the seat frame, links pivotally connecting the bearing blocks to the automobile floor, a main rotary shaft rotatively supported by one of said bearings at the front side, a pair of operating links pivotally connected together at their upper end portions, the lower end portions being fixedly secured to the main rotary shaft and pivotally connected to the link, respectively, which pivotally connects the bearing block that rotatively supports the main rotary shaft, a manipulating lever secured to the main rotary shaft, and operating lever disposed within the manipulating lever so as to actuate a stopper, and a counter member secured to the bearing block which rotatively supports the main rotary shaft and adapted to coact with the stopper.

8 Claims, 15 Drawing Figures

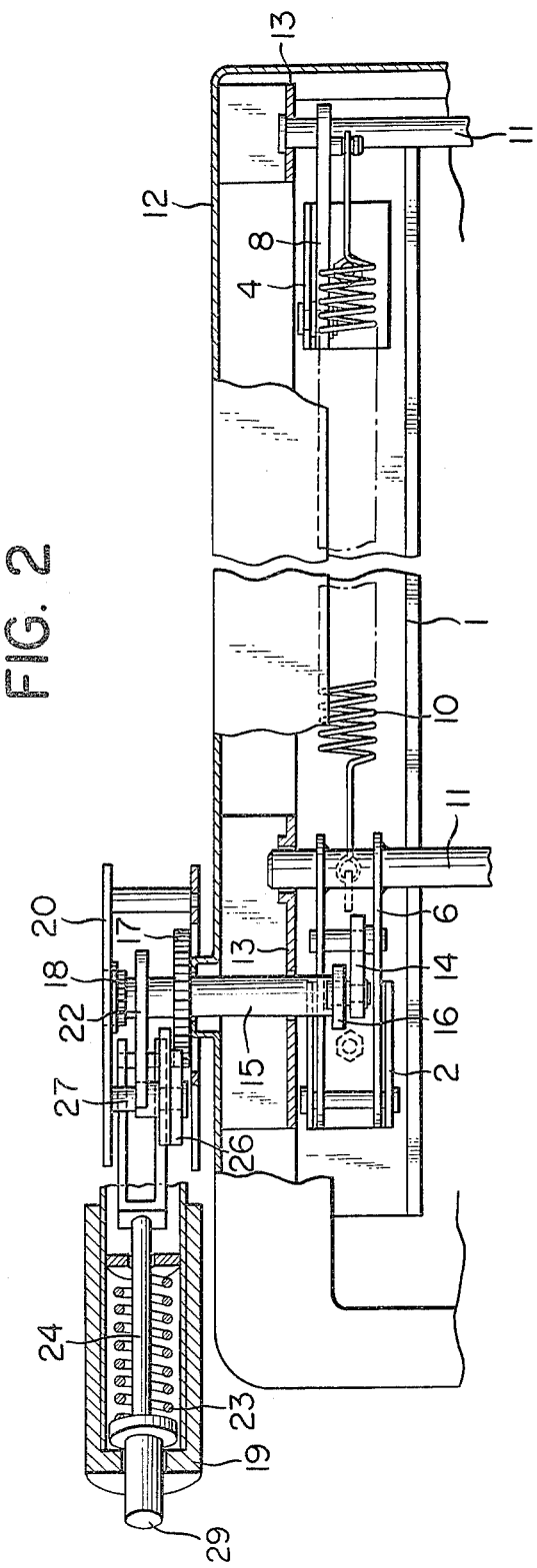
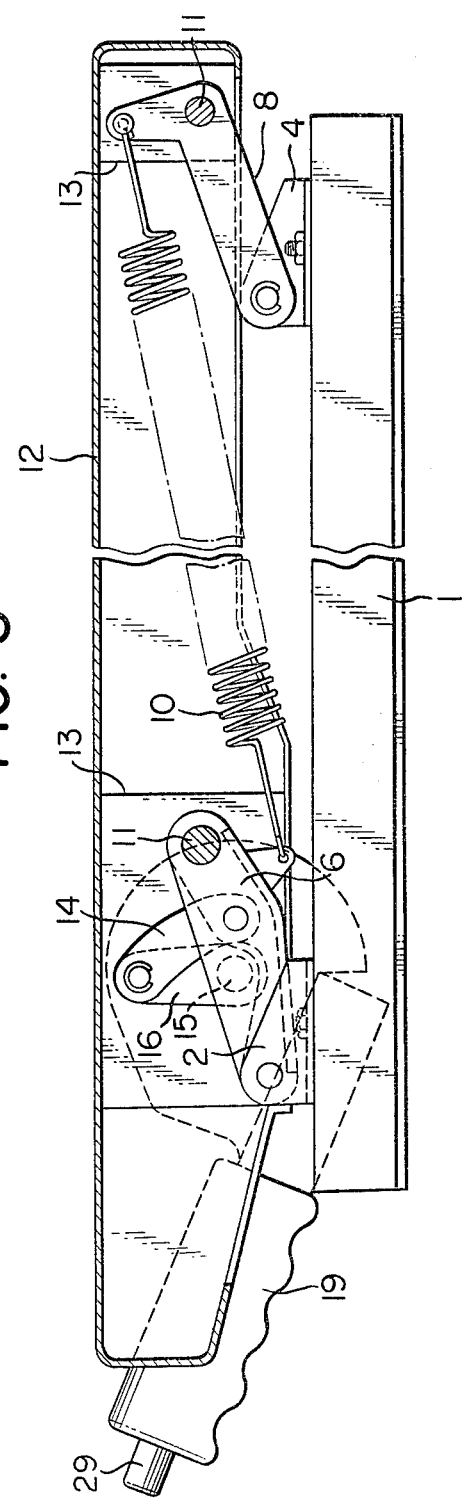

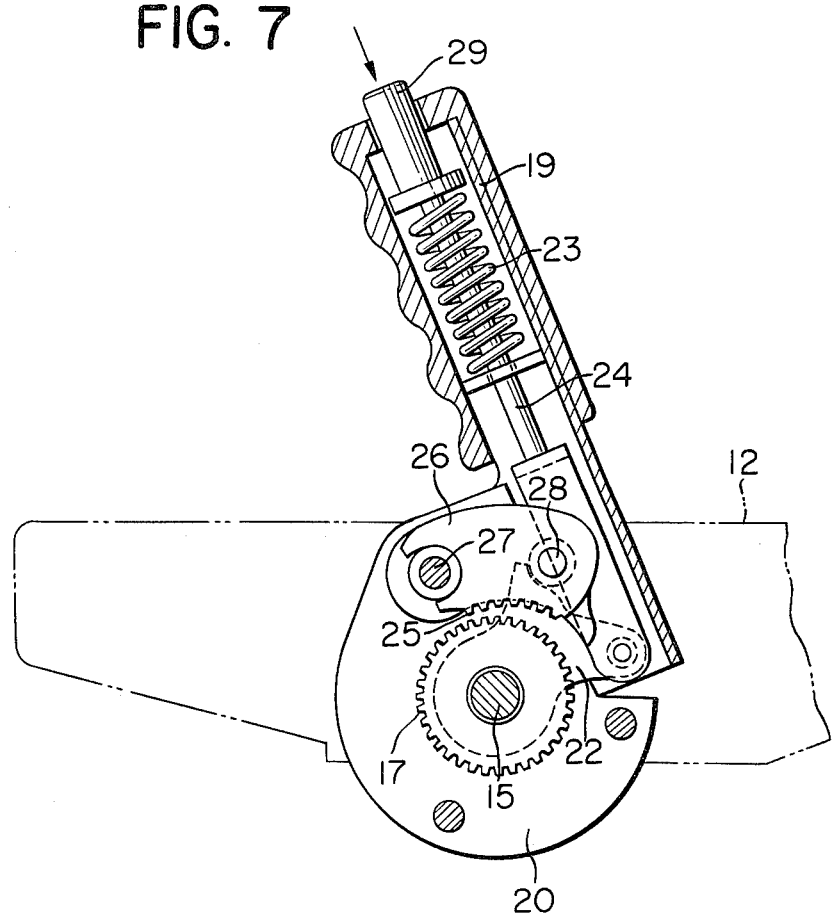
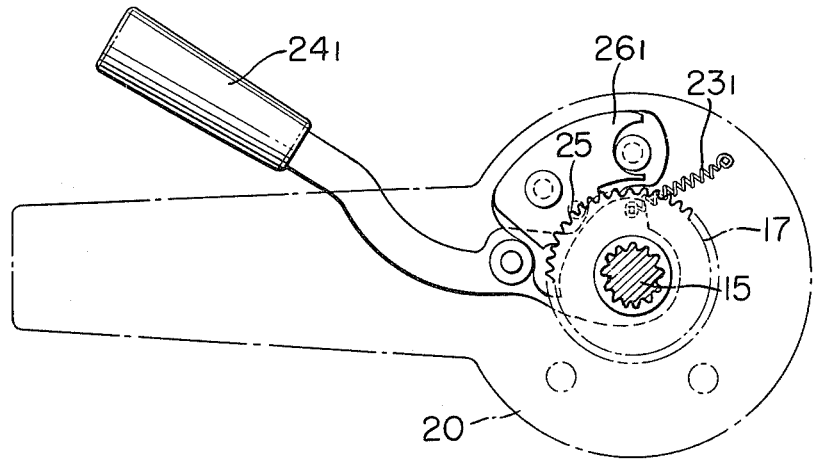

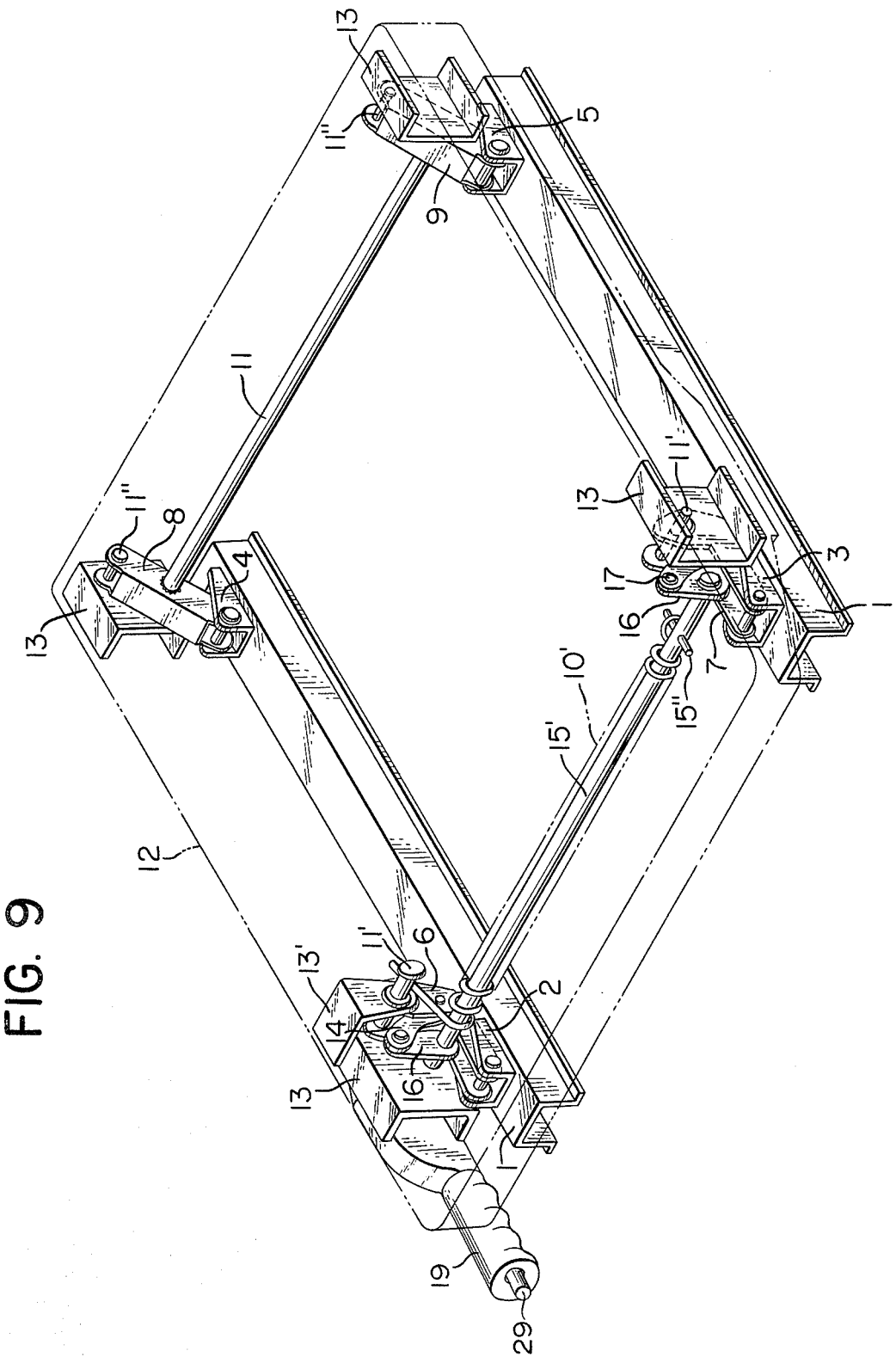

LIFTABLE DRIVER'S SEAT FOR AUTOMOBILES

BACKGROUND OF THE INVENTION

The present invention relates to a driver's seat for automobiles, and more particularly to a liftable driver's seat for automobiles.

It is generally desirable for an automobile driver to sit on the driver's seat at the most convenient position relative to e.g. the steering wheel, etc. However, it is generally the case that the driver's seat is fixedly set on the automobile floor, although forward and rearward movement to a limited extent may be allowed in some automobiles. Therefore, it has been desired to develop a driver's seat which can not only be shifted forward or rearward to a sufficient degree, but also can be raised or lowered to some extent.

It is true that various attempts to develop a driver's seat which meets such requirements have already been made. However, they are all complicated in construction, making the manufacture difficult and also very expensive.

SUMMARY OF THE INVENTION

It is a primary object of the present invention to provide a driver's seat for automobiles which can be not only shifted forwards or backwards, but also raised or lowered to the desired extent.

It is another object of the present invention to provide a driver's seat for automobiles which can be shifted forwards or backwards as well as raised or lowered with a relatively simple mechanism.

It is a further object of the present invention to provide a driver's seat for automobiles which can be shifted forwards or backwards as well as raised or lowered in the state of the driver sitting thereon with relatively little physical labour.

In accordance with the present invention, a driver's seat for automobiles is provided wherein a seat frame having generally a rectangular shape in the plan view is adapted to be supported on the automobile floor through four links each disposed near the respective corners thereof such that each of the links is pivoted at its one end to the floor and pivoted at the other end to the seat frame, a main rotary shaft rotatively mounted to the seat frame near one of the links preferably disposed forward and connected to this link through two operating links such that the two operating links are pivotally connected together at their one ends, one of the links being secured at its other end to the main rotary shaft and the other of the links being pivotally connected at its other end to the link, the main rotary shaft being further rigidly connected to a manipulating lever which is adapted to be releasably locked to the seat frame, whereby the manipulating lever, when released, can rotate the main rotary shaft to cause one of the two operating links fixedly secured thereto at its one end to be swung about the pivotal point between the two operating links owing to the fact that the respective links are pivotally connected to the automobile floor and the seat frame, resulting in the shift of the seat frame forward and backwards simultaneously due to the simultaneous swing of all of the links about their pivotal connecting points to the floor.

In one aspect of the present invention springs are disposed under tension between the pairs of links arranged longitudinally and act to assist the shift of the seat frame.

In another aspect of the present invention the main rotary shaft is elongated transversely to the operating link disposed opposite the operating link to which the main rotary shaft is secured, to be secured thereto, and a coil spring is wound around the main rotary shaft under torque and acts to assist the shift of the seat frame.

BRIEF DESCRIPTION OF THE DRAWINGS

These and other objects and advantages of the present invention will become apparent from the following description taken in connection with the accompanying drawings wherein are set forth by way of illustration and example certain embodiments of the present invention:

FIG. 2 is a partial plan view of the seat shown in FIG. 1, partially broken away;

FIG. 3 is a side elevational view of FIG. 2;

FIGS. 6 and 7 are side longitudinal sectional views of the manipulating lever shown in FIG. 1 at its different operational stages;

FIG. 8 is a side elevational view of a modification of the stopper actuating means shown in FIG. 1;

FIG. 9 is a similar view to FIG. 1, but showing another embodiment of the liftable driver's seat in accordance with the present invention;

DESCRIPTION OF THE PREFERRED EMBODIMENTS

Figure 1:
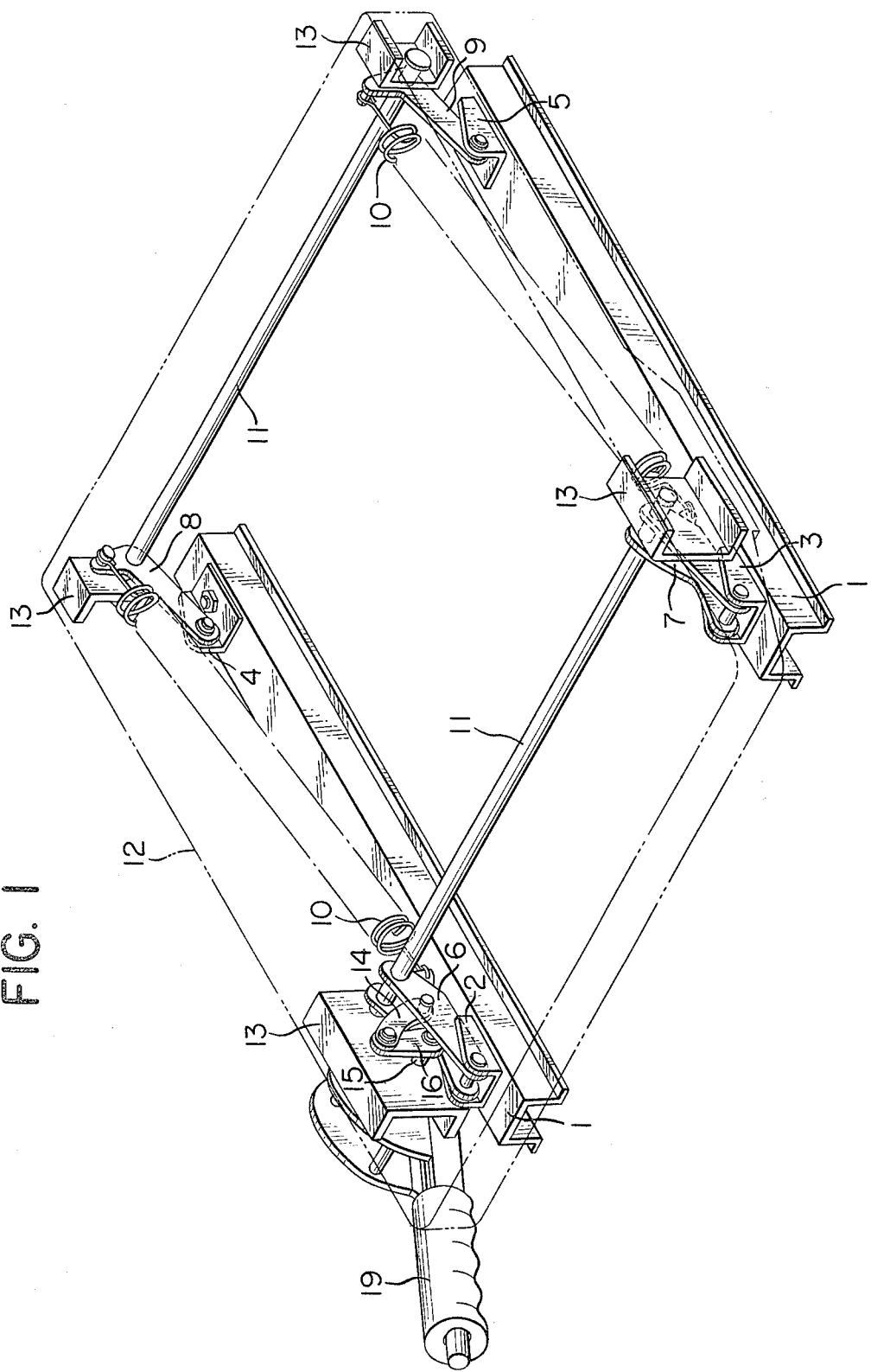
FIG. 1 is a perspective view showing one embodiment of the liftable driver's seat for automobiles in accordance with the present invention.
Figure 4:
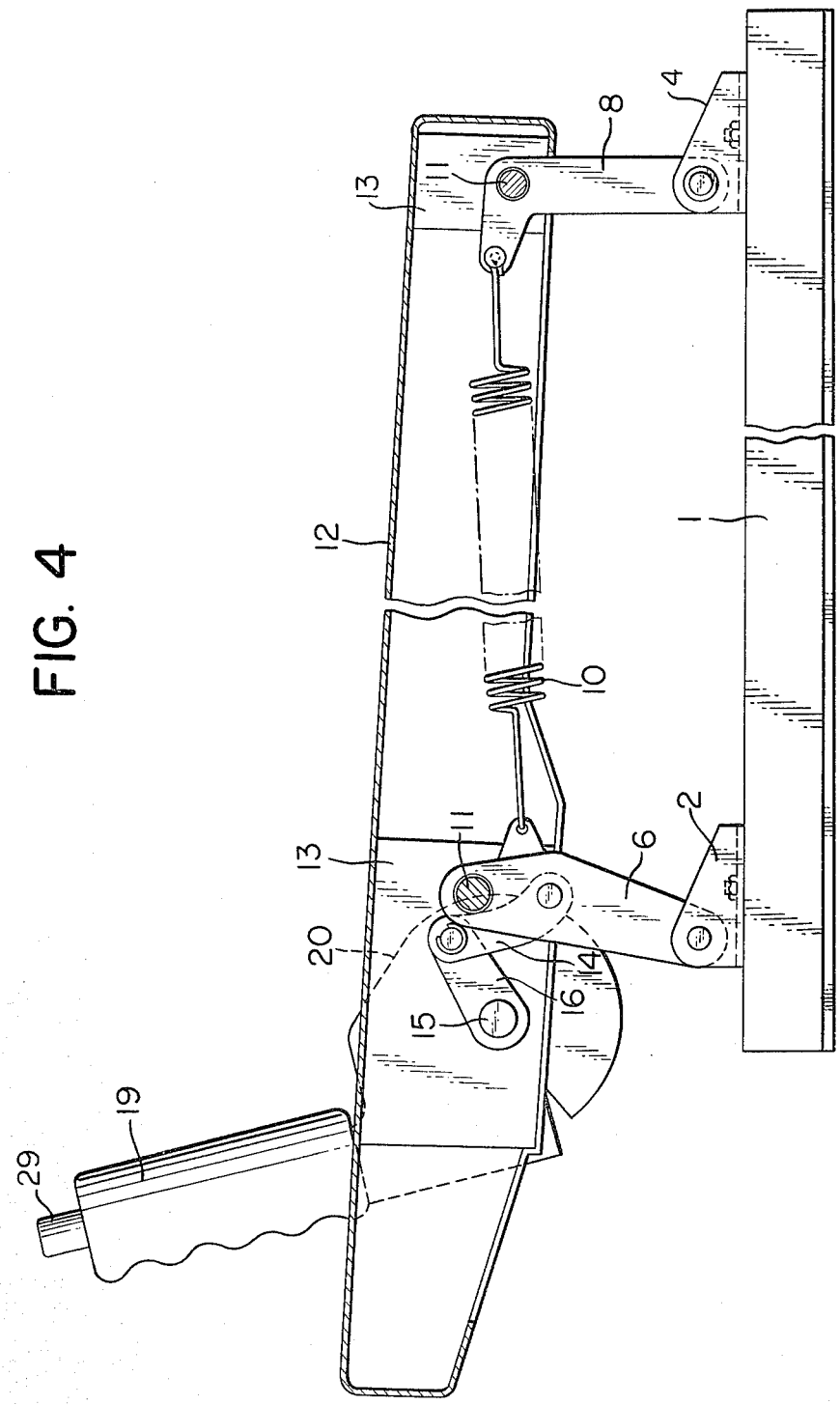
FIG. 4 is a view similar to FIG. 3, but showing the seat frame at a different position.
Figure 5:
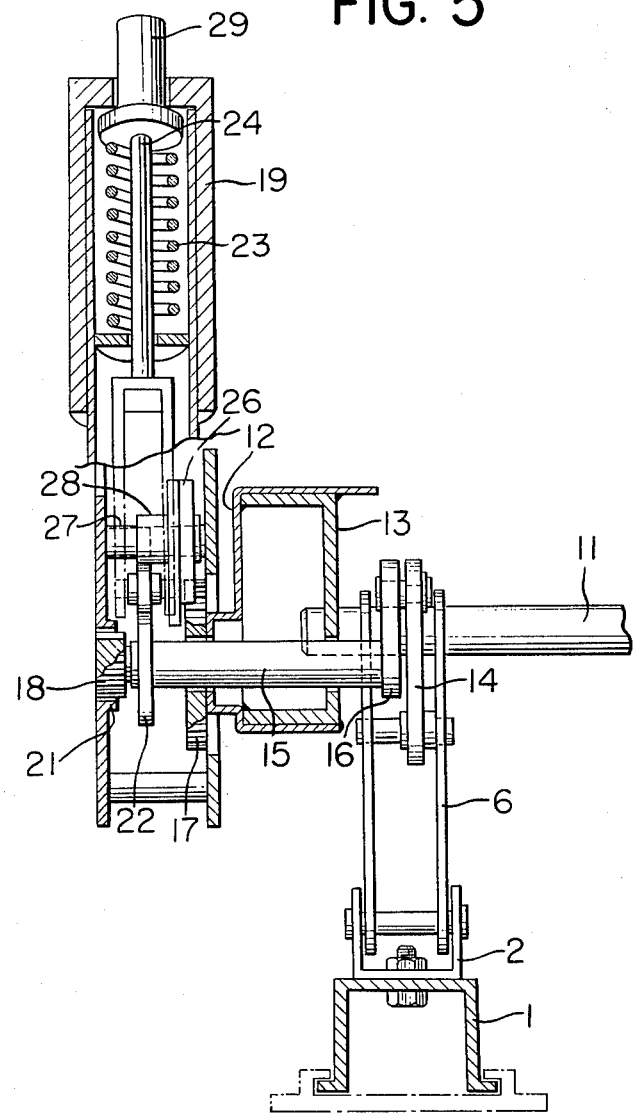
FIG. 5 is a front longitudinal sectional view of the manipulating lever shown in FIG. 1 at its upstanding position.

Reference is now made to FIGS. 1 to 7 of the attached drawings, wherein is shown an embodiment of the present invention. As shown in FIG. 1 there are a pair of base supports 1 to be secured to the floor surface in the driver's cab of an automobile in the axial direction thereof in parallel with each other a predetermined distance apart, each having a channel-like cross-section and being made of metal, e.g. steel. On the upper surfaces of base supports 1 near their ends four brackets 2, 3, 4 and 5 are secured by any suitable means such as welding, whereby the transversely confronting pairs of brackets such as 2 and 3, as well as 4 and 5, have generally a similar configuration, respectively. The first pair of brackets 2 and 3, located at the front side of the driver's cab and each having generally an upper opened channel shape, pivotally carry identical links 6 and 7, respectively, which have their one ends pivotally connected to brackets 2, 3 through pins. More particularly, each of links 6, 7 comprises, as shown in FIGS. 2 and 3, a pair of confronting vertical plate members having somewhat different configurations at their upper sides with their one ends being pivoted to brackets 2 and 3, respectively, the other ends passing a rotary shaft 11 therethrough to be fixedly secured thereto by such as welding.

The second pair of brackets 4 and 5, located at the rear end of the driver's cab and each having generally an L-shaped configuration pivotally carry links 8, 9, respectively, at their one ends using pins. Each of links 8, 9 has as shown in FIGS. 2 and 3, an L-shaped configuration with the end of the longer arm being pivoted to brackets 4 and 5, respectively by pins, the corner portion passing therethrough a further rotary shaft 11 to be fixedly secured thereto. In this case, links 6, 7 and 8, 9 are arranged such that they all elongate in the rearward direction with regards to base supports 1, and the pairs of lower portions of links 6, 7 and free end portions of the shorter arms of L-shaped links 8, 9 disposed longitudinally are respectively connected together by tension coil springs 10, 10.

The ends of rotary shafts 11 are rotatively supported by bearing blocks 13, each having generally a channel-like configuration and adapted to be fixedly secured to the inner surface of a seat frame 12, having generally a rectangular configuration in the plan view, near its two rear corners by any suitable means, such as welding. Another pair of similar bearing blocks 13, 13 are adapted to be secured to seat frame 12 near its front corners. As shown in FIGS. 2 and 3, link 6 has at its mid portion an operating link 14 pivotally secured thereto at its lower end such that the end of link 14 is interposed between the confronting plate members constituting link 6 and pivotally connected thereto by a pin secured at its both ends thereto. The upper end of operating link 14 is pivotally connected to a further operating link 16 at its upper end through a pin connecting them together, the lower end of operating link 16 being fixedly secured to a main rotary shaft 15 at its one end. Main rotary shaft 15 is rotatably supported by bearing block 13 and an outwardly protruded portion of the vertical wall of seat frame 12 such that shaft 15 passes through corresponding bores formed in bearing block 13 and the protruded portion. The outer end portion of main rotary shaft 15 extending out of seat frame 12 is integrally formed with a spline 18 which rigidly engages a corresponding spline 21 formed in a base frame 20 of a manipulating lever 19 so that lever 19 elongates at right angles to main rotary shaft 15. Manipulation lever 19 has, as shown in FIGS. 2, 5, 6 and 7, generally a hollow cylindrical shape with its upper portion being sheathed by a grip made of a suitable material, the grip having generally a hollow cylindrical shape and being closed at its upper end. Base frame 20 of manipulating lever 19 comprises two discs confronting each other, each having generally a circular shape, the two discs being connected together by a number of pins secured thereto so as to leave a gap therebetween, and both discs being fixedly secured at their upper portions to manipulating lever 19 at its lower portion by any suitable means, such as welding.

Figure 6:
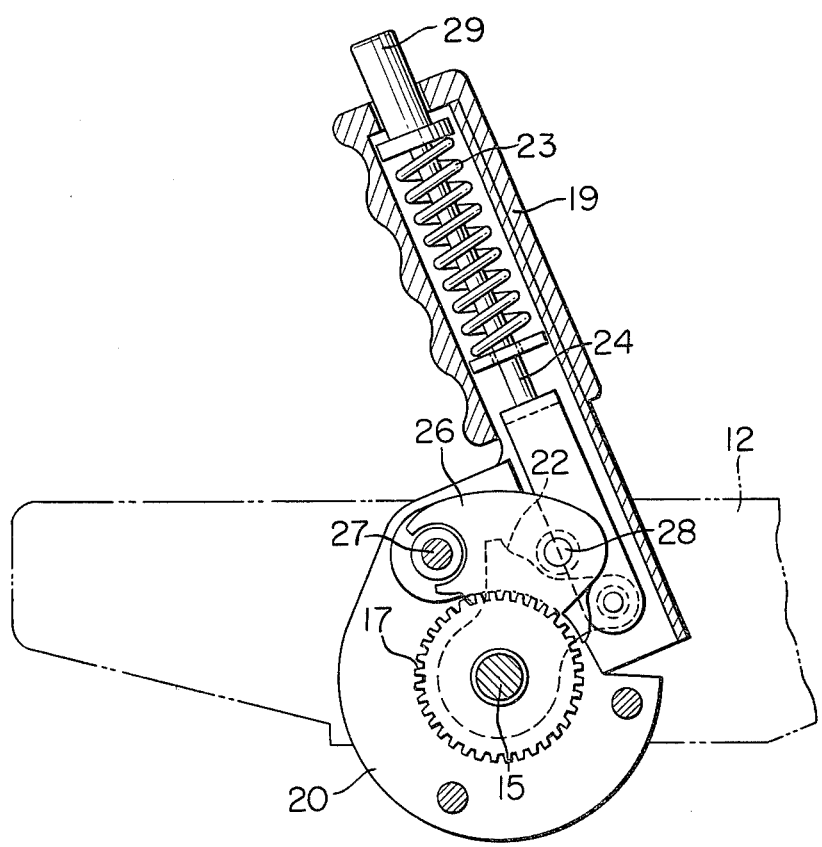
Figure 10:
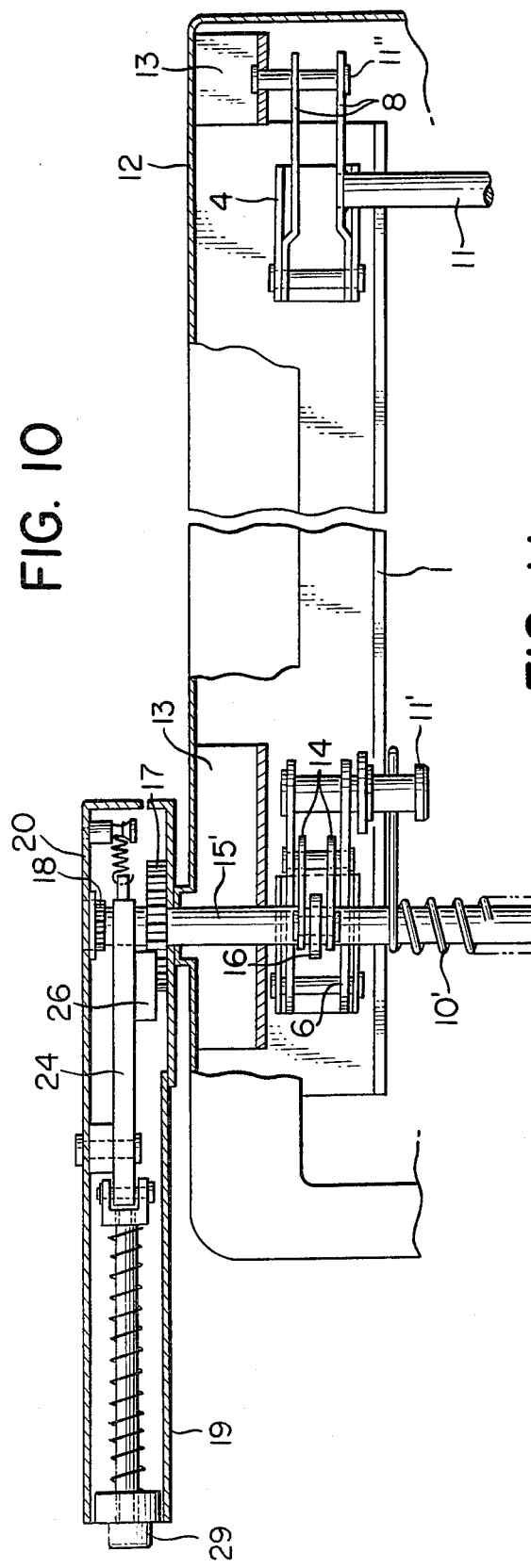
FIG. 10 is a partial plan view of the seat shown in FIG. 9, partially broken away.
Figure 11:
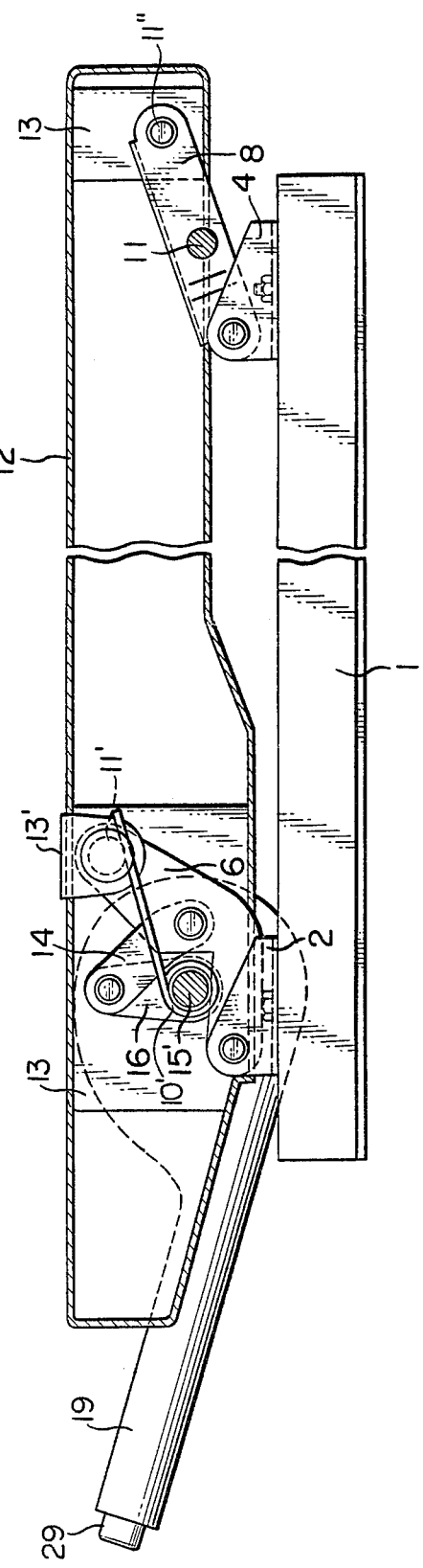
FIG. 11 is a side elevational view of FIG. 10.
Figure 12:
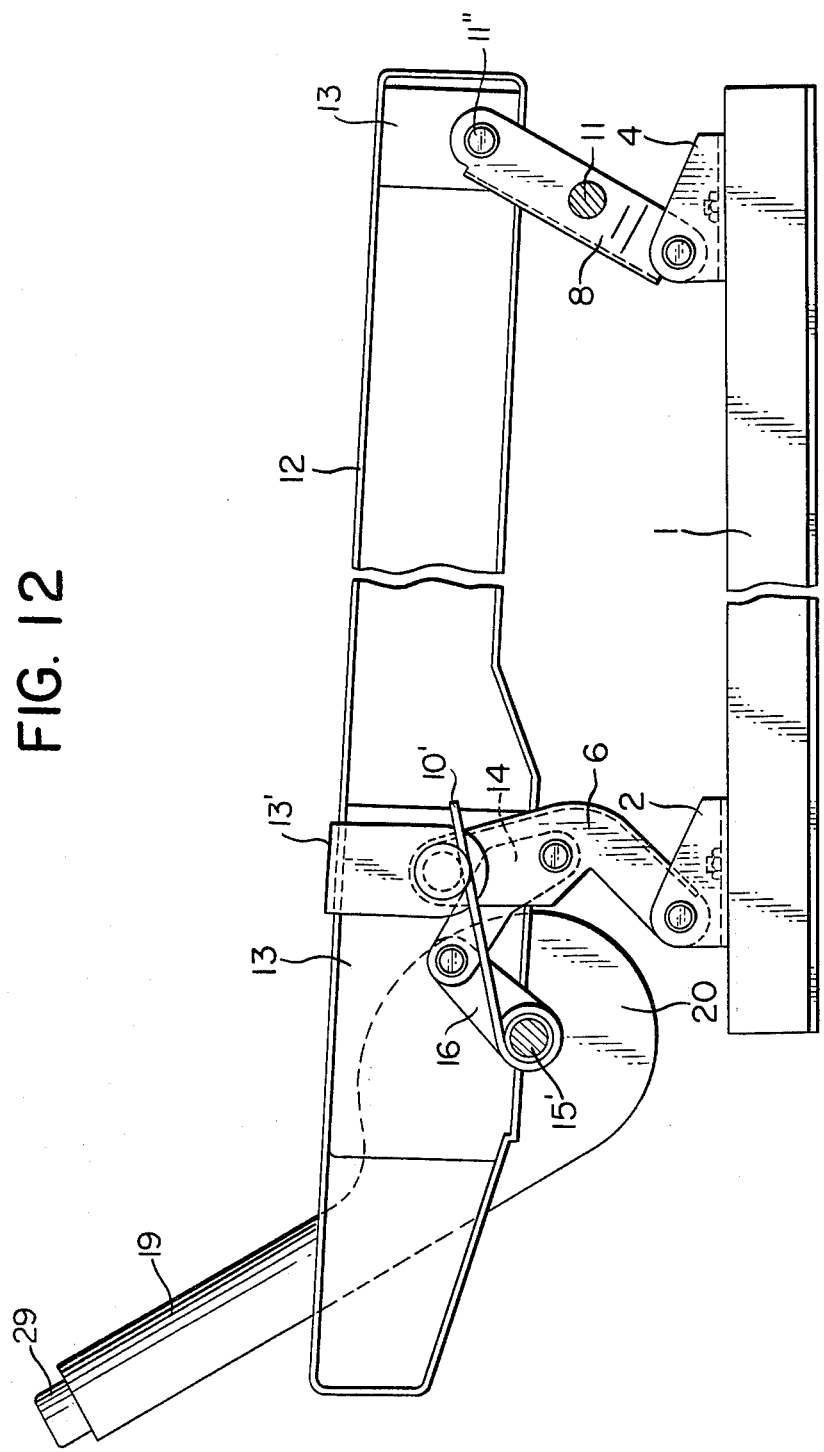
FIG. 12 is a view similar to FIG. 11, but showing the seat frame at a different position.
Figure 13:
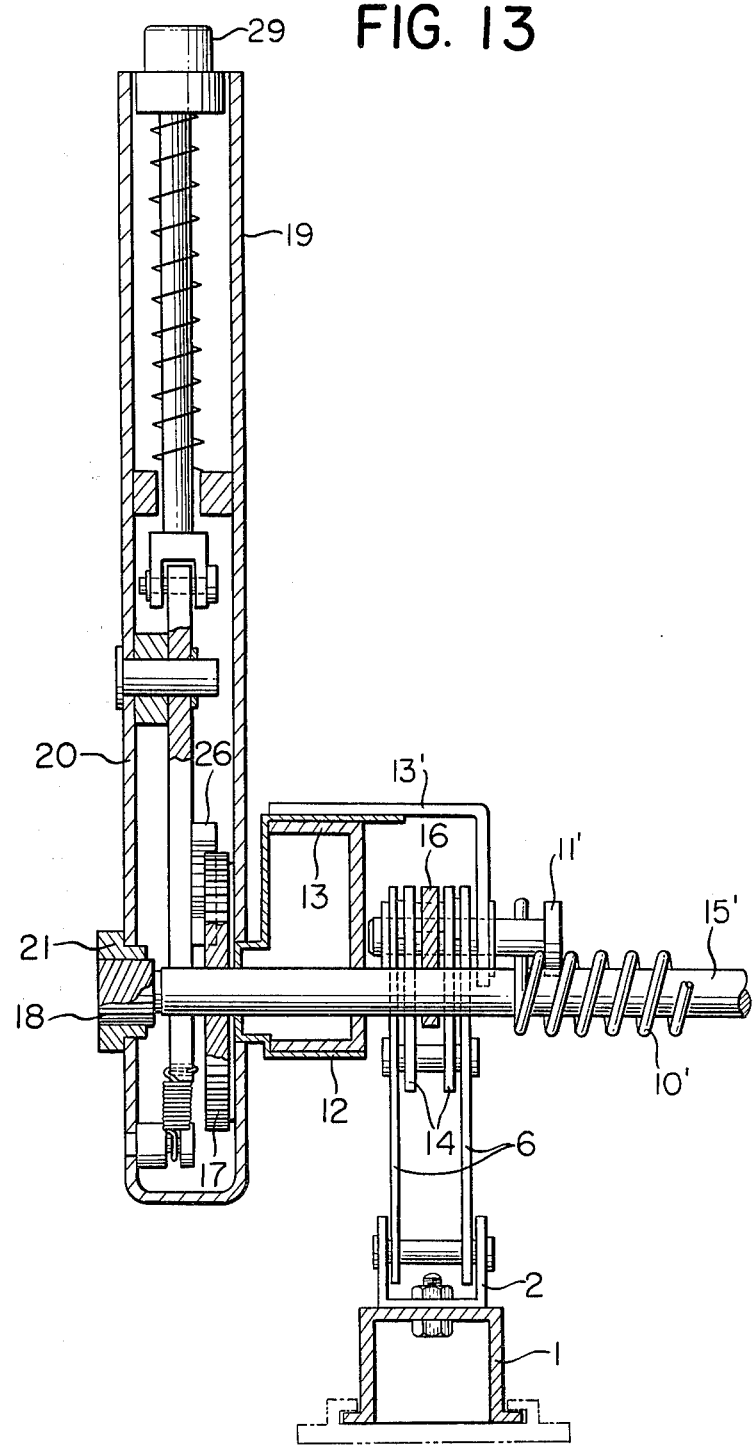
FIG. 13 is a front longitudinal sectional view of the manipulating lever shown in FIG. 9 at its upstanding position.

A plate cam 22 provided with a cam surface on its upper portion is, as shown in FIGS. 6, 7, loosely mounted at its lower portion on main rotary shaft 15 near spline 18 within the space formed between the confronting circular discs of base frame 20. As shown also in FIGS. 6 and 7, shiftably disposed within the hollow cylindrical space of manipulating lever 19 is an operating lever 24, the upper end of which is formed with a knob 29 to be projected outwards through an opening formed in the upper end wall of the grip of manipulating lever 19, and the lower end of which is bifurcated to be loosely introduced into the space formed between the circular discs of base frame 20. Operating lever 24 is always urged upwards by the action of a coil spring 23 disposed within the hollow cylindrical space of manipulating lever 19 so as to surround lever 24, spring 23 being under compression between two abutments secured to levers 19 and 24. Plate cam 22 has its cam surface provided on its upper portion disposed within the space formed between the bifurcated portions of operating lever 24 to be pivotally connected thereto by a pin secured thereto. A stopper 26 having generally an arcuate plate form with a toothed portion 25 being provided on its under periphery is pivotally connected at its base portion to base frame 20 between its circular discs by a pin 27 fixedly secured thereto such that stopper 26 is arranged in parallel with plate cam 22, a pusher 28 fixedly secured to stopper 26 at one side surface at the side of plate cam 22 being laid on plate cam 22 at its upper cam portion. Toothed portion 25 of stopper 26 is adapted to be always in mesh with the corresponding teeth of a stationary gear 17 secured to seat frame 12 at its projected portion through which main rotary shaft 15 loosely passes. See FIG. 6.

Thus, when operating lever 24 is moved downwards by pressing knob 29 downwards against the action of coil spring 23 from the position shown in FIG. 6 to that shown in FIG. 7, pusher 28 of stopper 26 is actuated by the upper cam portion of plate cam 22 to separate toothed portion 25 of stopper 26 from the teeth of stationary gear 17 so that the rotation of manipulating lever 19 to rotate main rotary shaft 15 is made possible, as is more fully described later. It will be appreciated that the relative positions of the cam portion of plate cam 22 and pusher 28 as well as the configuration of the cam portion should be suitably selected so as to allow the above operation upon actuation of operating lever 24 through knob 29 against the action of coil spring 23.

That is, their relative positions and the configuration of the cam portion may be as follows: as shown in FIG. 6, when operating lever 24 is in an inoperative position, i.e. in the uppermost position under the action of coil spring 23, pusher 28 of stopper 26 engages the lowermost part of the upper cam portion of plate cam 22, toothed portion 25 of stopper 26 being in mesh with the teeth of stationary gear 17, whereas, as shown in FIG. 7, upon pushing knob 29 downwards against the action of coil spring 23, operating lever 24 is caused to be moved downwards to rotate plate cam 22 about the center of main rotary shaft 15, resulting in the uppermost part of the upper cam portion of plate cam 22 thrusting pusher 28 upwards, whereby toothed portion 25 of stopper 26 is disengaged from the teeth of stationary gear 17.

Next the operation of the first embodiment of the present invention described above and shown in FIGS. 1 to 7 will be explained.

If a driver sitting on the driver's seat, represented by seat frame 12 as indicated by the phantom lines in FIG. 1, at its lowest position desires to raise it, he must grasp manipulating lever 19, which has fallen forwards, with his right hand in the state of sitting on the seat and at the same time push knob 29 projecting outwards from the end of manipulating lever 19 downwards with his thumb against the action of coil spring 23. Then operating lever 24 is urged downwards and plate cam 22 pivotally connected thereto is rotated about main rotary shaft 15, whereby stopper 26 is rotated about pin 27 as the result of the abutment of pusher 28 with the uppermost part of the cam portion of plate cam 22 so that toothed portion 25 of stopper 26 is separated from the teeth of stationary gear 17. At this stage, when manipulating lever 19 is raised upwards, main rotary shaft 15 fixedly secured to base frame 20 of manipulating lever 19 through the engagement of splines 18, 21 is simultaneously rotated so that operating link 16 secured to shaft 15 is also rotated about the pin which pivotally connects the upper end of operating link 16 to the other operating link 14 at its upper end. In this case, operating link 14 pivotally connected at its upper end portion to operating link 16 at its upper end portion is caused to be moved downwards. However, since link 6 pivotally connected to operating link 14 at its lower end cannot be moved downwards owing to the fact that link 6 has its lower end pivotally connected to bracket 2 and its upper end fixedly secured to rotary shaft 11, and rotary shaft 11 is pivotally connected to seat frame 12 through bearing blocks 13, operating link 16 is inevitably forced to be rotated about its pivotal point to operating link 14 clockwise as viewed in FIG. 3, so that main rotary shaft 15 is shifted forwards or backwards accompanying seat frame 12. As a result, operating link 14 is also moved to swing link 6 about its pivotal point to bracket 2 counter clockwise as viewed in FIG. 3. In this case, link 7 is simultaneously caused to be swung about its pivotal point to bracket 3 in the same direction as link 6 due to its connection to link 6 through rotary shaft 11 so that seat frame 12 is moved at its front portion smoothly by the simultaneous swing of links 6 and 7 about their pivotal points to brackets 2 and 3, respectively. In this case, owing to the pivotal connection of seat frame 12 to brackets 4 and 5 such that rotary shaft 11 pivotally connected to seat frame 12 through bearing blocks 13, 13 secured thereto has one end of links 8 and 9 secured thereto with the other ends pivotally connected to brackets 4 and 5, respectively, seat frame 12 is swung also about the pivotal points of links 8 and 8 through them so that seat frame 12 moves substantially in parallel with the plain originally occupied by it during the operation of manipulating lever 19. Upon release of the pushing on knob 29, teeth 25 of stopper 26 meshes with the teeth of stationary gear 17, resulting in the stoppage of the rotation of main rotary shaft 15, so that seat frame 12 is locked in position at a desired adjusted position relative to the steering wheel or the like.

It is, of course, easy to lower or retract seat frame 12 from this position by a similar procedure. That is, upon holding manipulating lever 19 and pushing knob 29 downwards, teeth 25 of stopper 26 disengage from the teeth of stationary gear 17 so that seat frame 12 is lowered by its own weight plus the driver's weight with links 6 to 9 being swung about their pivotal points to brackets 2 to 5, respectively.

At this point it will be appreciated that coil springs 10, 10 disposed between links 6 and 8, and 7 and 9, respectively, each being kept under a predetermined tensioned condition in the lowest position of seat frame 12 as shown in FIG. 1, assist in the raising or forward shift operation of seat frame 12 by the actuation of manipulating lever 19 owing to the shortening of coil springs 10, which is caused as links 6 to 9 swing about their pivotal points to brackets 2 to 5, respectively.

Thus, when the seat has reached the desired height, if the driver stops the actuation of manipulating lever 19 and releases the pushing force on knob 29 of operating lever 24, stopper 26 has its toothed portion 25 spontaneously engaged with the teeth of stationary gear 17 to stop the rotation of main rotary shaft 15, resulting in the settlement of the seat frame 12 at this raised position of the seat.

Instead of constituting an engaging and disengaging means between stationary gear 17 and toothed portion 25 of stopper 26 such that toothed portion 25 is disengaged from the teeth of gear 17 by the push of operating lever 24 against the force of spring 23, as shown in FIG. 8, a stopper 26, adapted to be actuated by a separate lever 24, and having a toothed portion 25 at its inner periphery, can be equally adopted in association with a coil spring 23, which acts to always urge toothed portion 25 of stopper 26, in engagement with stationary gear 17.

Next an other embodiment of the present invention will be explained in reference to FIGS. 9 to 15, wherein the parts similar to those in the first embodiment shown in FIGS. 1 to 7 bear identical reference numerals.

There are several differences in this embodiment from the first one. That is, in the front part of seat frame 12, although in the first embodiment the length of main rotary shaft 15 is limited so as to be elongated up to the neighbourhood of link 6 at the side of manipulating lever 19, in the second embodiment main rotary shaft 15' is elongated beyond this link 6 to link 7 arranged opposite thereto where it is fixedly secured to operating link 16 at this lower end. Further, although in the first embodiment, in the front part of seat frame 12, rotary shaft 11 is elongated so as to be pivoted to confronting bearing blocks 13, in the second embodiment rotary shaft 11 is separated into two short rotary shafts 11', each pivotally supported by bearing blocks 13 through a bracket 13' secured thereto (at the side of manipulating lever 19) or directly (at the side opposite thereto). In the rear portion, although in the first embodiment rotary shaft 11 is pivotally connected at its each end to confronting bearing blocks 13, 13 through a common rotary shaft 11, in the second embodiment rotary shaft 11 is fixedly connected at each end to confronting links 8 and 9 at their mid portions, the ends of the links 8 and 9 being pivotally connected to bearing blocks 13, 13 through pins 11'', 11''. Another difference in the second embodiment from the first is that instead of a pair of coil springs 10, 10 a single coil spring 10' is wound around main rotary shaft 15' with one end being secured thereto by a pin 15'' so as to protrude, the other end being elongated to abut the underside of short rotary shaft 11' at the side of manipulating lever 19, as shown in FIGS. 9, 10, 11 and 12.

Figure 14:
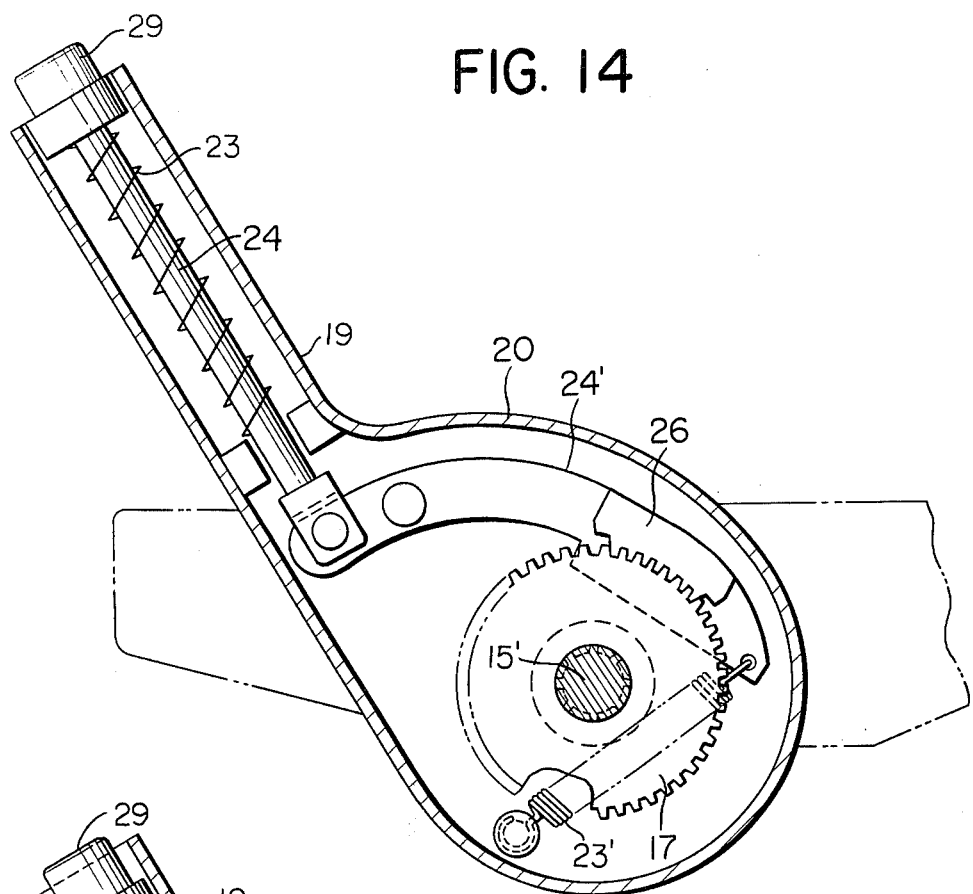
FIGS. 14 and 15 are side elevational views of the manipulating lever shown in FIG. 9 in its two different operational stages.
Figure 15:
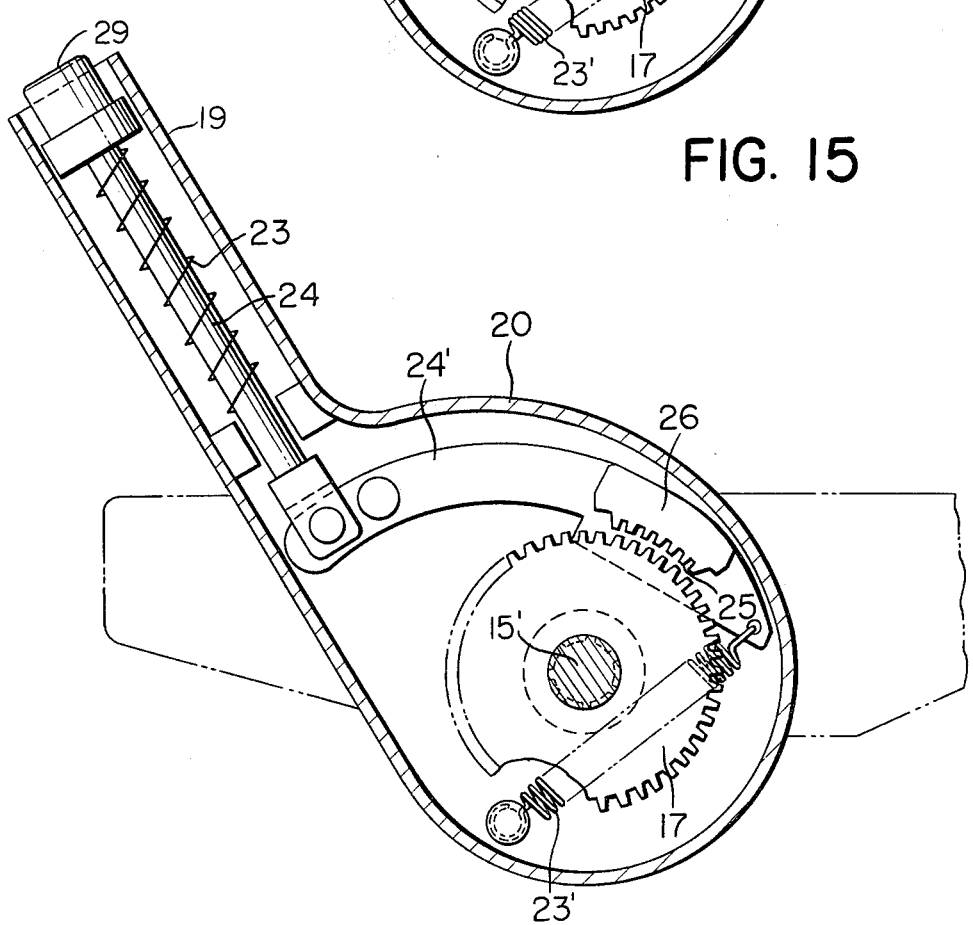

As a minor difference, as shown in FIGS. 14 and 15, there is the difference in the constitution of stopper 26. That is, operating lever 24 is pivotally connected at its lower end to an arcuate lever 24' at its one end which is in turn pivotally connected to base frame 20 near this end by a pin, the other end portion of arcuate lever 24 having stopper 26 as a gear segment secured thereto, teeth 25 of stopper 26 always being in mesh with the teeth of stationary gear 17 by the action of a coil spring 23' disposed between the end of arcuate lever 24' near stopper 26 and base frame 20, spring 23' cooperating with coil spring 23 to usually keep teeth 25 of stopper 26 in mesh with the teeth of stationary gear 17.

The operation of the second embodiment is quite similar to that of the first embodiment so that it can be easily deduced from the previous explanation of the operation of the first embodiment. Therefore, a detailed explanation as to the operation of the second embodiment will not be entered into further.

The most important difference in operation in this second embodiment from the first embodiment resides in the operation of coil spring 10' disposed around main rotary shaft 15'. That is, coil spring 10' serves to assist in the raising of seat frame 12 by the actuation of manipulating lever 19 such that the end of coil spring 10' near manipulating lever 19 acts to push upwards short rotary shaft 11' by the resilient force previously accumulated therein, and at the same time coil spring 10' serves to prevent the abrupt fall of seat frame 12 at the time of its fall by the actuation of manipulating lever 19.

Although there have been described above specific embodiments of the present invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the present invention as defined in the appended claims.

What is claimed is:

1. A liftable driver's seat for automobiles comprising a seat frame having substantially a rectangular shape in the plan view, bearing block means disposed near the four corners of said seat frame so as to be rigidly secured thereto, link means pivotally connecting said bearing means to the floor of said automobile so as to be elongated in substantially the same direction, a main rotary shaft means rotatably supported by one of said bearing blocks, a pair of operating links pivotally connected together at one of their end portions, with the other end of one of said operating links being fixedly secured to said main rotary shaft, the other end of the other of said operating links being pivotally connected to one of said link means disposed near said bearing block which rotatably supports said main rotary shaft, and a manipulating lever means having generally a hollow cylindrical form and detachably secured to said main rotary shaft, said manipulating lever means is provided with a stopper means which is adapted to coact with a counter element secured to said bearing block which rotatively supports said rotary shaft such that said stopper means usually prevents said rotary shaft from being rotated in association with said counter element, but whereby, when said stopper means is separated from said counter element, said main rotary shaft is allowed to be rotated by said manipulating lever means.

2. A liftable driver's seat for automobiles as claimed in claim 1 wherein said manipulating lever means comprises a base frame formed at its lower portion and adapted to be fixedly secured to said main rotary shaft, whereby said stopper means is pivotally connected to said base frame, a grip means formed at its upper portion, an operating lever disposed centrally of said grip means, a plate cam means rotatably carried on said main rotary shaft and pivotary connected to said operating lever, said plate cam means having a cam portion adapted to cooperate with said stopper means, a spring means disposed within said grip means and adapted always to urge said operating lever upwards so that said plate cam means allows said stopper means to engage said counter element by the weight of said stopper means, but whereby, when said operating lever is activated against the action of said spring means, said plate cam means operates to have said stopper means released from engagement with said counter element.

3. A liftable driver's seat for automobiles as claimed in claim 1 wherein said manipulating lever means comprises a base frame formed at its lower portion and adapted to be fixedly secured to said main rotary shaft, a grip means formed at its upper portion, an operating lever disposed centrally of said grip means, an arcuate lever means pivotally connected to said base frame and pivotally connected at one end to said operating lever at its lower end, whereby said stopper means is mounted to said arcuate lever means, a spring means disposed within said grip means to always urge said operating lever upwards, and a further spring means disposed between said arcuate lever means and said base frame to always urge said stopper means into engagement with said counter element.

4. A liftable driver's seat for automobiles as claimed in claim 1 or 3 wherein said stopper means is a sector gear and said counter element is a stationary gear secured to said bearing block which rotatively supports said main rotary shaft and arranged so as to loosely pass therethrough said main rotary shaft, whereby said sector gear and said stationary gear have the same number of teeth.

5. A liftable driver's seat for automobiles comprising a seat frame having substantially a rectangular shape in the plan view, bearing block means disposed near the four corners of said seat frame so as to be rigidly secured thereto, link means pivotally connecting said bearing means to the floor of said automobile so as to be elongated in substantially the same direction, said link means arranged forward so as to confront each other are connected together by a rotary shaft secured thereto which is rotatably supported at its both ends by said bearing blocks which are disposed forward on said seat frame so as to confront each other a main rotary shaft means rotatably supported by one of said bearing blocks, a pair of operating links pivotally connected together at one of their end portions, with the other end of one of said operating links being fixedly secured to said main rotary shaft, the other end of the other of said operating links being pivotally connected to one of said link means disposed near said bearing block which rotatably supports said main rotary shaft, and a manipulating lever means having generally a hollow cylindrical form and detachably secured to said main rotary shaft.

6. A liftable driver's seat for automobiles comprising a seat frame having substantially a rectangular shape in the plan view, bearing block means disposed near the four corners of said seat frame so as to be rigidly secured thereto, link means pivotally connecting said bearing means to the floor of said automobile so as to be elongated in substantially the same direction, each pair of said link means arranged longitudinally is connected together by a spring under tension a main rotary shaft means rotatably supported by one of said bearing blocks, a pair of operating links pivotally connected together at one of their end portions, with the other end of one of said operating links being fixedly secured to said main rotary shaft, the other end of the other of said operating links being pivotally connected to one of said link means disposed near said bearing block which rotatably supports said main rotary shaft, and a manipulating lever means having generally a hollow cylindrical form and detachably secured to said main rotary shaft.

7. A liftable driver's seat for automobiles comprising a seat frame having substantially a rectangular shape in the plan view, bearing block means disposed near the four corners of said frame so as to be rigidly secured thereto, link means pivotally connecting said bearing means to the floor of said automobile so as to be elongated in substantially the same direction, a main rotary shaft means rotatably supported by one of said bearing blocks, a pair of operating links pivotally connected together at one of their end portions, with the other end of one of said operating links being fixedly secured to said main rotary shaft, the other end of the other of said operating links being pivotally connected to one of said link means disposed near said bearing block which rotatably supports said main rotary shaft, a manipulating lever means having generally a hollow cylindrical form and detachably secured to said main rotary shaft, and another pair of operating links pivotally connected together at one of their end portions similarly to said pair of operating links near the one of said bearing blocks which is disposed opposite said bearing block which rotatably supports said main rotary shaft such that the other end of one of said another pair of operating links is fixedly secured to the end of said main rotary shaft which is elongated transversely up to said other end, the other end of the other of said another pair of operating links being pivotally connected to the one of said link means disposed near said one of said bearing blocks as recited in this claim.

8. A liftable driver's seat for automobiles as claimed in claim 7 wherein a coil spring is wound around said main rotary shaft under torque such that one end of said spring is secured to said main rotary shaft, the other end abutting said bearing block near said manipulating lever so as to always urge said bearing block upwards.

* * * * *